(12) United States Patent
Nelson et al.

(10) Patent No.: US 9,068,643 B2
(45) Date of Patent: Jun. 30, 2015

(54) EFFICIENCY SPUR GEAR SET HOUSING

(71) Applicant: Caterpillar Inc., Peoria, IL (US)

(72) Inventors: Benjamin T. Nelson, Dunlap, IL (US); Andrew J. Krajnik, Plainfield, IL (US); John J. Krone, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 116 days.

(21) Appl. No.: 13/676,735

(22) Filed: Nov. 14, 2012

(65) Prior Publication Data

US 2014/0130634 A1  May 15, 2014

(51) Int. Cl.
*F16H 57/04* (2010.01)

(52) U.S. Cl.
CPC ......... *F16H 57/0424* (2013.01); *Y10T 74/2186* (2015.01); *F16H 57/0409* (2013.01)

(58) Field of Classification Search
CPC .................................................. F16H 57/0424
USPC ........ 74/606 R, 467; 184/6.12; 418/15, 206.4
See application file for complete search history.

(56) References Cited

U.S. PATENT DOCUMENTS

| | | | | |
|---|---|---|---|---|
| 2,708,985 | A | * | 5/1955 | Evans et al. ................... 184/11.1 |
| 2,834,432 | A | * | 5/1958 | Sacks ............................ 184/6.12 |
| 3,785,458 | A | * | 1/1974 | Caldwell et al. ............. 184/6.12 |
| 4,266,915 | A | * | 5/1981 | McBurnett et al. ........... 418/126 |
| 6,152,715 | A | | 11/2000 | Kaempe et al. |
| 6,468,046 | B1 | | 10/2002 | Du et al. |
| 6,623,247 | B2 | | 9/2003 | Du |
| 6,672,055 | B1 | | 1/2004 | Konishi et al. |
| 6,848,888 | B2 | | 2/2005 | Du et al. |
| 7,566,207 | B1 | | 7/2009 | Holder et al. |
| 7,806,667 | B1 | | 10/2010 | Hauser et al. |
| 7,963,186 | B2 | * | 6/2011 | Hayes et al. ..................... 74/467 |
| 2011/0079293 | A1 | | 4/2011 | Gollner |
| 2013/0343929 | A1 | * | 12/2013 | Tombers ....................... 417/406 |
| 2014/0003912 | A1 | * | 1/2014 | Knaack ....................... 415/122.1 |

FOREIGN PATENT DOCUMENTS

| | | |
|---|---|---|
| DE | 19652831 B4 | 6/1998 |
| GB | 1248032 A | 9/1971 |
| JP | 09-039593 | 2/1997 |
| JP | 3103533 B2 | 8/2000 |
| JP | 2002155866 A | 5/2002 |
| JP | 2002357177 A | 12/2002 |
| JP | 2004190675 A | 7/2004 |
| JP | 2011-58397 A | 3/2011 |
| JP | 2011-064144 | 3/2011 |

* cited by examiner

*Primary Examiner* — Vinh Luong
(74) *Attorney, Agent, or Firm* — Miller, Matthias & Hull LLP (57) ABSTRACT

A hydraulic pump housing comprises passages formed in an inner wall separating the gear cavity and the pump cavity to allow for the movement of fluid into and out of the gear cavity, thereby alleviating some of the power loss caused by churning lubricating oil. The hydraulic pump may comprise spaces integrally formed in axially opposing surfaces of the gear cavity walls adjacent the area where the gears mesh to enable the churning oil to expand and flow around the gears.

25 Claims, 6 Drawing Sheets

EFFICIENCY SPUR GEAR SET HOUSING

TECHNICAL FIELD

This disclosure relates generally to a spur gear sets. More particularly, this disclosure relates to a spur gear set housing such as that found in a side by side hydraulic pump and including means to reduce power loss from oil churning.

BACKGROUND

Machines such as dozers, loaders, excavators and other types of machinery typically include a hydro-mechanical power transmission system to transfer power, e.g., torque and rotational speed generated by a power source, to one or more connected loads, e.g., a machine tool or attachment. A major component of these hydro-mechanical power transmission systems is a hydraulic pump.

One type of hydraulic pump is a side by side hydraulic piston pump, which comprises a pump housing defining a gear cavity housing, a spur gear set, and a pump cavity housing a pair of pumps. The gear cavity houses side by side spur gears. The pump cavity houses a drive pump and an idler pump. Both pumps are piston pumps, in which reciprocating pistons are arranged within a pump barrel which is operably connected to a rotating shaft. The drive pump may be connected to a crankshaft and thus is driven by a motor or other power source. The idler pump is connected to an idler shaft which is connected to the crankshaft via the spur gear set. The pistons within each pump extend outwardly from one end of each pump barrel and impinge on a cam plate. As the barrel and pistons rotate, the pistons reciprocate, causing hydraulic fluid located on the side of the piston within the pump housing to exit the pump under pressure.

The spur gear set transmits power from the crankshaft to the idler shaft and thus to the idler pump. A drive gear located in the gear cavity and affixed to the end of the drive shaft opposite the drive pump barrel meshes with, and transmits power to, an idler gear, causing the idler gear to rotate, which in turn rotates the idler pump.

The pump cavities are filled with lubricating fluid which surrounds the pumps, shafts and spur gears. The pump housing surrounds the spur gears and also provides channels for the fluid to move around each gear as the gears turn. One gear turns clockwise while the other gear turns counterclockwise. As the gears turn they move the surrounding fluid within the gear cavity in their direction of movement. Oil churned by these spur gears can cause a power loss. Where the gears mesh, the churning fluid causes some resistance because of the limited space for movement of the fluid. This churning represents a parasitic load on the machine power source and can result in a power loss. This power loss can be on the order of 0.4 kW.

The present disclosure is directed toward one or more of the problems set forth above.

SUMMARY OF THE DISCLOSURE

In one aspect of the disclosure, a housing for a spur gear set is provided which includes fluid flow passages. The housing has a first member and a second member substantially coextensive with the first member. The first and second members are affixed together to define a gear cavity within which are located a drive gear and a driven gear submerged in fluid. The first member comprises an inner wall which forms a rear inner surface of the gear cavity and a perimeter wall which forms a top inner surface, a bottom inner surface and side inner surfaces of the gear cavity. The second member forms a front inner surface of the gear cavity that substantially opposes (faces) the rear inner surface. The housing further comprises one or more passages formed in the inner wall to allow movement of the fluid into and out of the gear cavity. The housing may be the kind used for hydraulic pumps.

In another aspect of the disclosure, a housing for a spur gear set is provided which includes expansion features. The housing comprises a first member and a second member affixed together to define a gear cavity within which are located a drive gear and a driven gear submerged in fluid. The gear cavity has an area where the gears mesh. The first member comprises an inner wall forming a substantially planar rear inner surface of the gear cavity and a perimeter wall forming a top inner surface, a bottom inner surface and side inner surfaces of the gear cavity. The second member forms a substantially planar front inner surface of the gear cavity. The housing further comprises a first expansion integrally formed in the rear inner surface of the inner wall adjacent to the area where the gears mesh. The first expansion is a space through which the fluid can flow around the gears from one side of the gear mesh area to the other side of the gear mesh area. The housing may further comprise a second expansion integrally formed in the front inner surface of the second member adjacent to the gear mesh area. The second expansion also is a space through which the fluid can flow around the gears from one side of the gear mesh area to the other side of the gear mesh area. The housing may be the kind used for hydraulic pumps.

DETAILED DESCRIPTION

While this disclosure may be embodied in many forms, there is shown in the drawings and will herein be described in detail one or more embodiments with the understanding that this disclosure is to be considered an exemplification of the principles of the disclosure and is not intended to limit the disclosure to the illustrated embodiments.

In the discussion that follows and the accompanying figures, the following geometric terms are used:

Drive Axis A: the axis defined by the drive pump shaft 34.

Idler Axis B: the axis defined by the idler pump shaft 40.

Plane C: the plane that intersects the drive axis A and the idler axis B and bisects the gear cavity 14 in the horizontal direction.

Plane D: the plane that is orthogonal to plane C and bisects the gear cavity 14 in the vertical direction.

Figure 1:
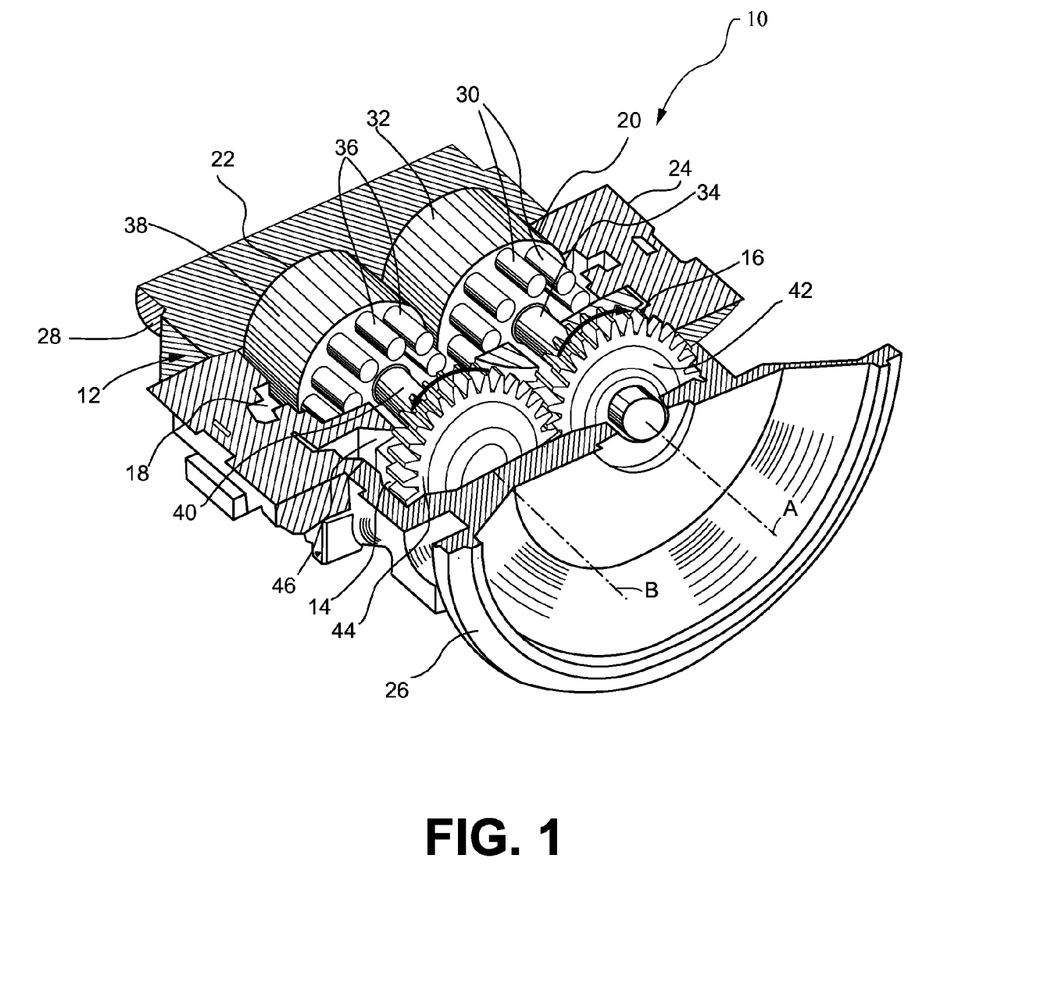
FIG. 1 is a cutaway perspective view of a hydraulic pump including a spur gear set.

Turning to the drawings, there is shown in FIG. 1 a cutaway perspective view of a hydraulic side by side piston pump 10. The pump comprises a three piece, cast iron, pump housing 12 defining a first (gear) cavity 14 which houses a spur gear set 16 and a second (pump) cavity 18 which houses a pair of piston pumps 20, 22. The cavities are separated by an integrally formed inner wall 46 that extends substantially parallel to a plane defined by the spur gear set 16. One of the pumps is a drive pump 20 and the other pump is an idler pump 22. The cavities 14, 18 are filled with fluid (such as lubricating oil) in which the spur gear set 16 and the pumps 20, 22 are immersed.

The pump housing 12 may be formed from three cast pieces consisting of a body 24, a flange 26 bolted to one end of the body 24 and a head 28 bolted to the other end of the body 24. The body 24 houses the spur gear set 16 and the pumps 20, 22. The flange 26 is affixed to and extends from one end of the body 24, and may house an engine flywheel. The head 28 is affixed to and extends from the other (pump) end of the body 24. During assembly the pumps 20, 22 are inserted into the pump cavity 18 before the head 28 is attached to the body 24 and the spur gear set 16 is inserted into the gear cavity 14 before the flange 26 is attached to the body 24.

The drive pump 20 comprises reciprocating pistons 30 arranged within a pump barrel 32 which is operably connected to a rotating drive pump shaft 34. The drive pump shaft 34 defines an axis or center line A, is aligned with the engine crankshaft 60 and is driven by the crankshaft 60.

Similarly, the idler pump 22 comprises reciprocating pistons 36 arranged within a pump barrel 38 which is operably connected to a rotating idler pump shaft 40. As explained in the following paragraph, the idler pump shaft 40 is driven by one of the spur gears.

The spur gear set 16 transmits power from the drive pump 20 to the idler pump 22. A first (or drive) gear 42 located in the gear cavity 14 and affixed to the drive pump shaft 34 meshes with, and transmits power to, a second (or idler) gear 44, causing the idler gear 44 to rotate in the opposite direction (see arrows in FIG. 1), which in turn rotates the idler pump 22. This side by side configuration achieves a doubling of pumping output from a single input shaft, i.e., the crankshaft 60. The drive gear 42 rotates about the drive axis A and the idler gear rotates about an idler axis B defined by the idler shaft 40.

The gear cavity 14 in which the spur gear set 16 is located is separated from the pump cavity 18 in which the pumps 20, 22 are located by the inner wall 46. The inner wall 46 is oriented transversely (perpendicularly) to the drive axis A and idler axis B. As explained in more detail below, the inner wall 46 defines one or more passages to allow oil to flow between the cavities 14, 18. The inner wall 46 also defines a substantially circular drive shaft opening 56 for accommodating the drive shaft 34 and a substantially circular idler shaft opening 58 for accommodating the idler shaft 40 (see FIG. 2).

Figure 2:
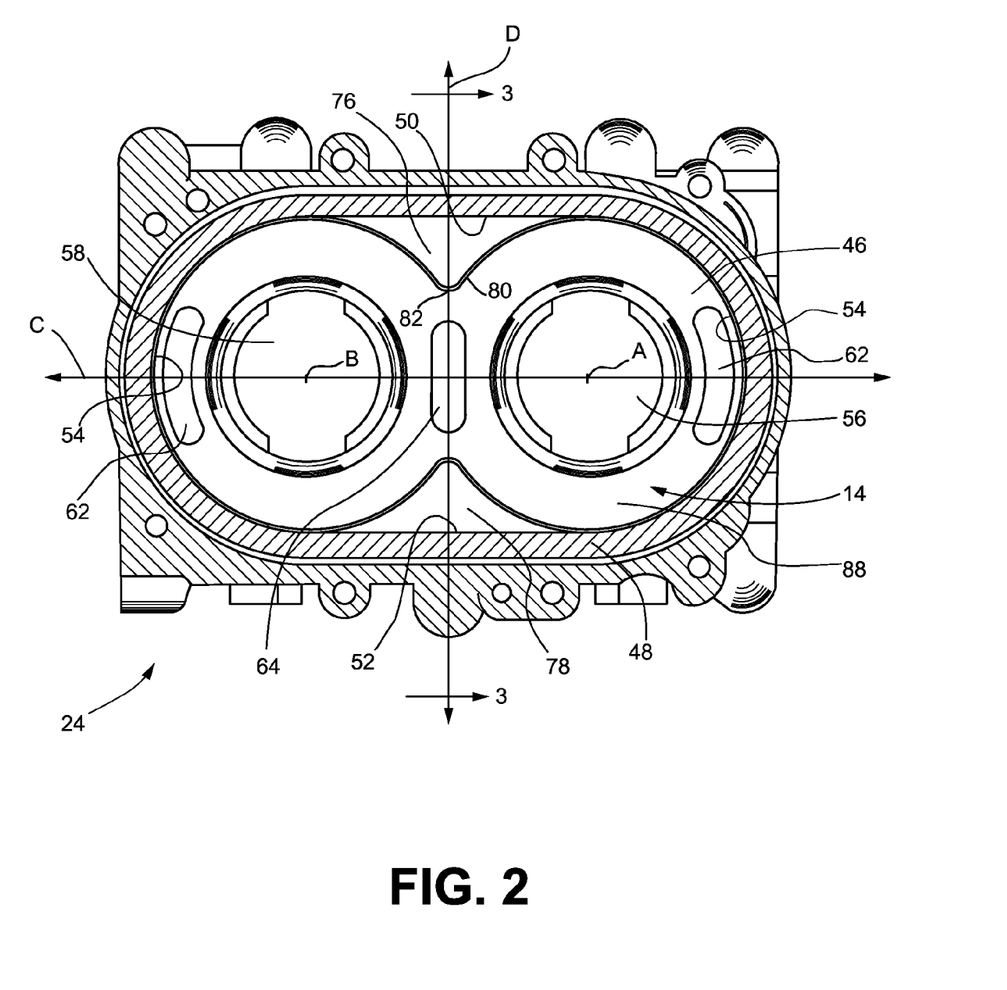
FIG. 2 is a front view of a pump housing body with the flange removed to better show the gear cavity.

FIG. 2 is a front view of the housing body 24 of FIG. 1. The flange 26 that normally is bolted to the body 24 has been removed along with the spur gear set 16, revealing the gear cavity 14 where the spurs gear set 16 would be located. This view is taken from the crankshaft end of the body 24 looking "through" the inner wall 46 toward the pump cavity 18 located on the other side of the inner wall 46. In addition to the inner wall 46, the body 24 comprises a substantially cylindrical perimeter wall 48 that forms the perimeter of the gear cavity 14. The inner surface of the perimeter wall 48 facing the gear cavity 14 comprises a relatively flat top inner surface 50 and a relatively flat bottom inner surface 52 connected at their respective ends by curved side inner surfaces 54. The perimeter wall 48, and thus the gear cavity 14, is symmetrical about a horizontal plane C that intersects the drive axis A and the idler axis B. Plane C bisects the gear cavity 14 in the horizontal direction. The perimeter wall 48, and thus the gear cavity 14, is also symmetrical about a vertical plane D which bisects the gear cavity 14 in the vertical direction. The inner wall 46 forms one end of the gear cavity 14 and the flange 26 (FIG. 3) forms the other end of the gear cavity.

Viewing the hydraulic pump 10 from the perspective of FIG. 1, the drive gear 42 turns clockwise while the idler gear 44 turns counterclockwise as indicated by the curved arrows. (These arrows also appear in FIGS. 6 and 8. The drive gear directional arrow also appears in FIGS. 3 and 4.) As the gears 42, 44 turn in opposite directions, they cause the surrounding fluid to move in their direction of movement. Where the gears 42, 44 mesh, the churning fluid causes some turning resistance because of the limited space for fluid movement, resulting in a power loss. The churning fluid can result in a power reduction on the order of 0.4 kW.

In one aspect of the disclosure, passages are cut out of or otherwise formed in the inner wall 46 separating the gear cavity 14 and the pump cavity 18. These passages allow for the movement of fluid between the gear cavity 14 and the pump cavity 18, which alleviates some of the resistance caused by the churning fluid.

Because of the construction of the hydraulic pump 10, the possible locations and shapes of the passages are limited. For example, the inner wall 46 depicted in FIG. 2 includes three passages: two arcuate shaped side passages 62 located near the side inner surfaces 54 of the perimeter wall 48 on either side of the gear set 16, and a vertical, substantially linear center passage 64 located axially adjacent to the area where the gears mesh. These passages 62, 64 enable the lubricating oil to flow between the gear cavity 14 and the pump cavity 18. Preferably, each side passage 62 forms an arc of less than ninety degrees that is concentric with the nearest gear 42, 44 or shaft opening 56, 58. The side passages 62 and the center passage 64 may be symmetrical about the horizontal plane C and the vertical plane D. In other words, both the side passages 62 and center passage 64 may be equidistant from the top inner surface 50 and the bottom inner surface 52 of the perimeter wall 48.

The body 24 may include integrally formed top and bottom gear shrouds 76, 78. The shrouds 76, 78 change the shape of the gear cavity 14 from an oval or, more accurately, a racetrack shape, to a shape that more closely conforms to the shape of the gear set 16, which also helps minimize the energy losses due to oil churning and thus improves the efficiency of the hydraulic pump 10. The top gear shroud 76 extends downward from the top inner surface 50 of the perimeter wall 48 and has downwardly converging curved sides 80 that meet along a substantially linear apex 82 located equidistant the gears 42, 44. Similarly, the bottom gear shroud 78 extends upward from the bottom inner surface 52 of the perimeter wall 48 and has upwardly converging curved sides 84 that meet along a substantially linear apex 86 located equidistant the gears 42, 44. The shrouds 76, 78 are symmetric about both the horizontal plane C and the vertical plane D.

Figure 3:
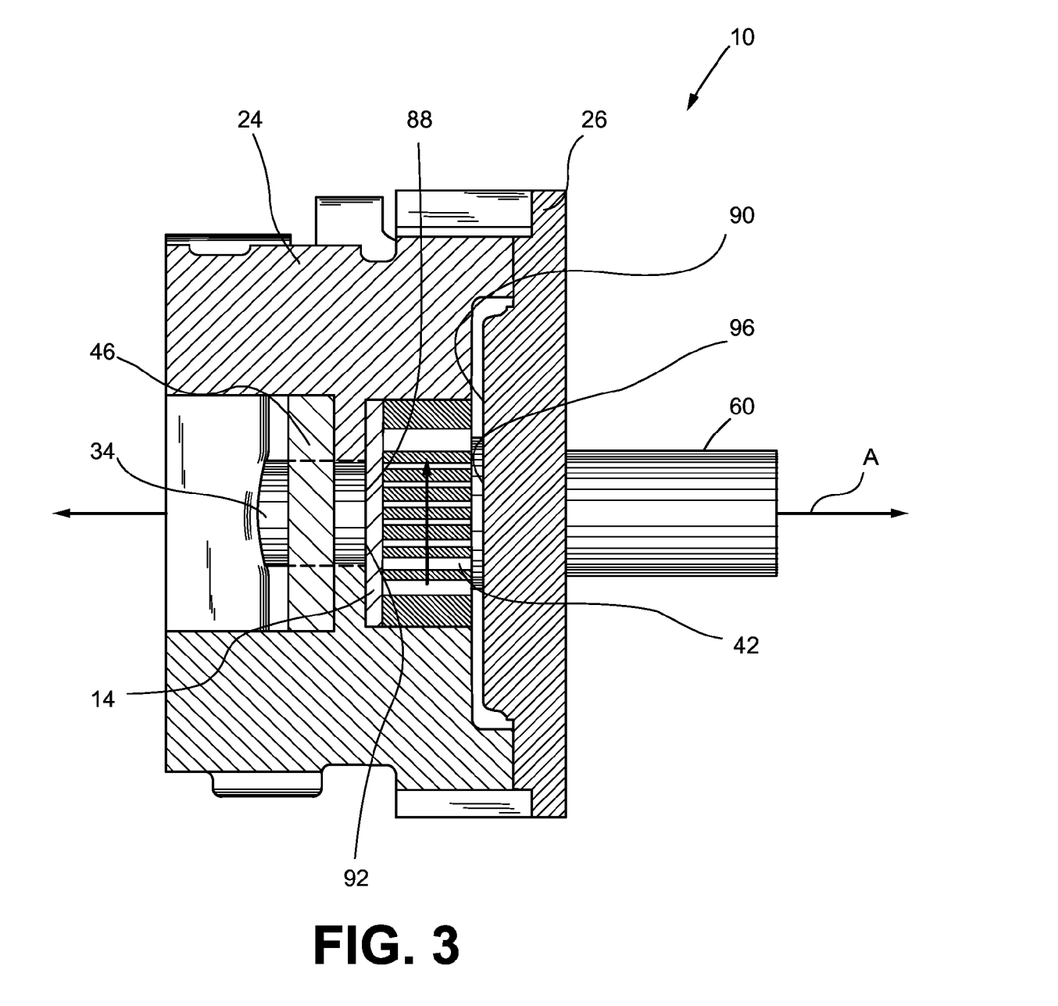
FIG. 3 is a partial side cutaway view of the hydraulic pump of FIG. 1 taken along line 3-3 of FIG. 2.

FIG. 3 is a partial side cutaway view of the hydraulic pump 10 of FIG. 1 taken along line 3-3 of FIG. 2. As previously explained, the housing body 24 forms three of the four inner surfaces of the gear cavity 14: the top surface, the bottom surface and the pump side surface. (The fourth inner surface of the gear cavity 14 is formed by the flange 26 shown in FIG. 1.) Thus the housing body inner wall 46 forms the rear inner surface 88 of the gear cavity 14 while the flange 26 forms the opposing, front inner surface 90 of the gear cavity 14. The crankshaft 60 shown in FIG. 3 is operably connected to the drive pump shaft 34.

In the illustrations shown in FIGS. 2 and 3, the rear inner surface 88 of the inner wall 46 (and this the gear cavity 14) is substantially flat, and is oriented parallel to a plane defined by the gear set 16. In particular, the rear inner surface 88 is substantially flat in the area 92 (FIG. 5) adjacent to where the gears mesh, i.e., basically the area between the drive shaft opening 56 and the idler shaft opening 58. Likewise, the front inner surface 90 of the flange 26 is substantially flat in the same area 92 adjacent to where the gears mesh. Because of the walls 88, 90 adjacent to where the gears mesh are flat, the lubricating oil flowing around the gear mesh area 92 between the gears 42, 44 and the walls 88, 90 flows at an increased speed and pressure until the flows come together on the "exit" side where the gears "unmesh", which causes friction and power loss.

Figure 4:
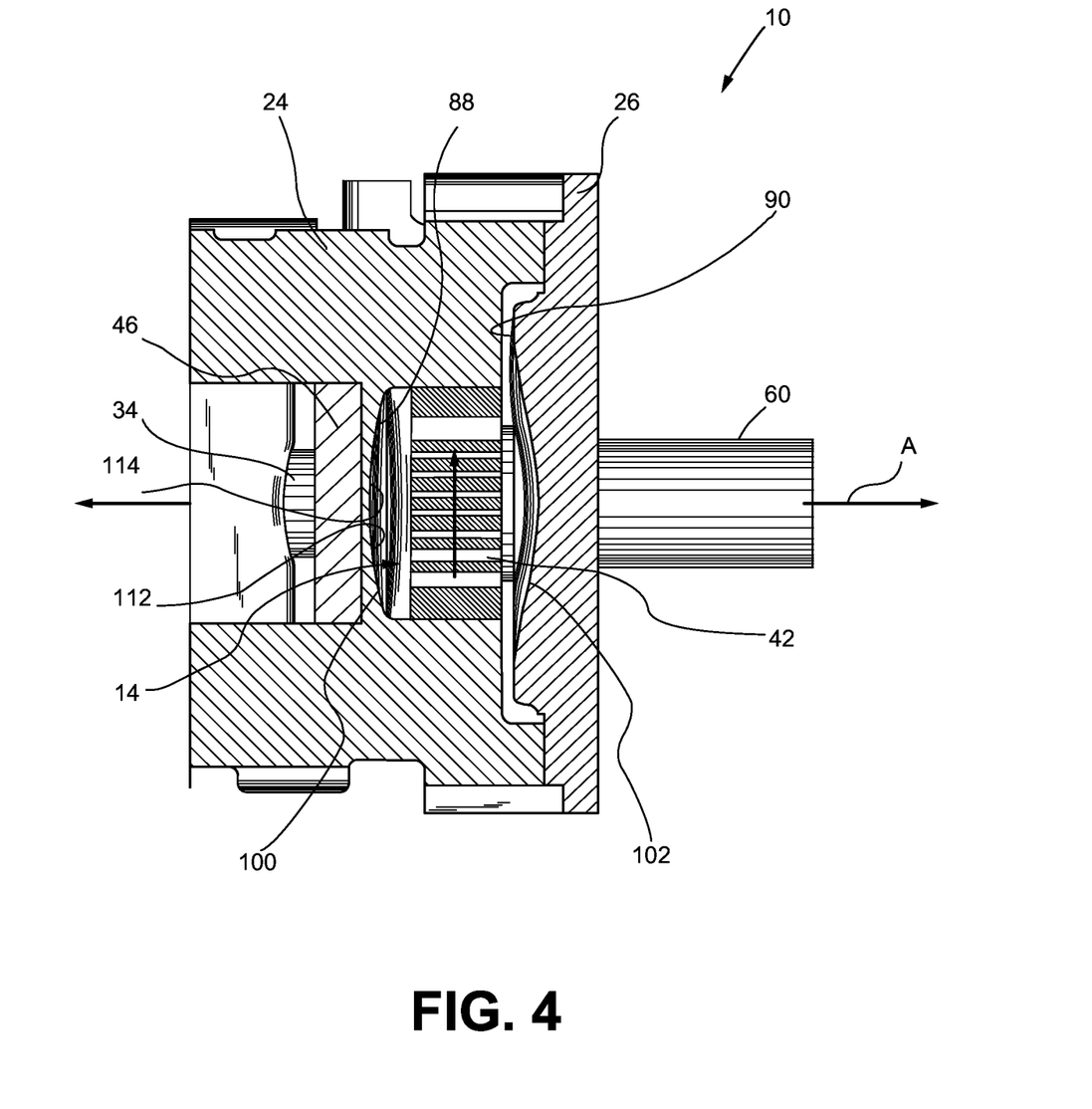
FIG. 4 is a partial side cutaway view of a hydraulic pump with some modifications according to the present disclosure.

FIG. 4 is a similar side cutaway view of the pump housing 12 of FIG. 1, but with some modifications from the pump housing 12 of FIG. 3. These modifications are intended to minimize the energy losses due to oil churning and thus improve the efficiency of the hydraulic pump 10. The modifications give the oil more room to flow around the gear mesh area 92, which reduces the oil velocity and pressure and power loss.

In accordance with this objective, a pair of expansions 100, 102 are integrally formed in the cast iron body 24 to enable the churning fluid to flow into the areas 92 adjacent to and on either side of where the gears mesh. A body expansion 100 is machined out of or otherwise formed in the rear inner surface 88 of the gear cavity 14. A flange expansion 102 is machined out of or otherwise formed in the front inner surface 90 of the gear cavity 14.

Figure 5:
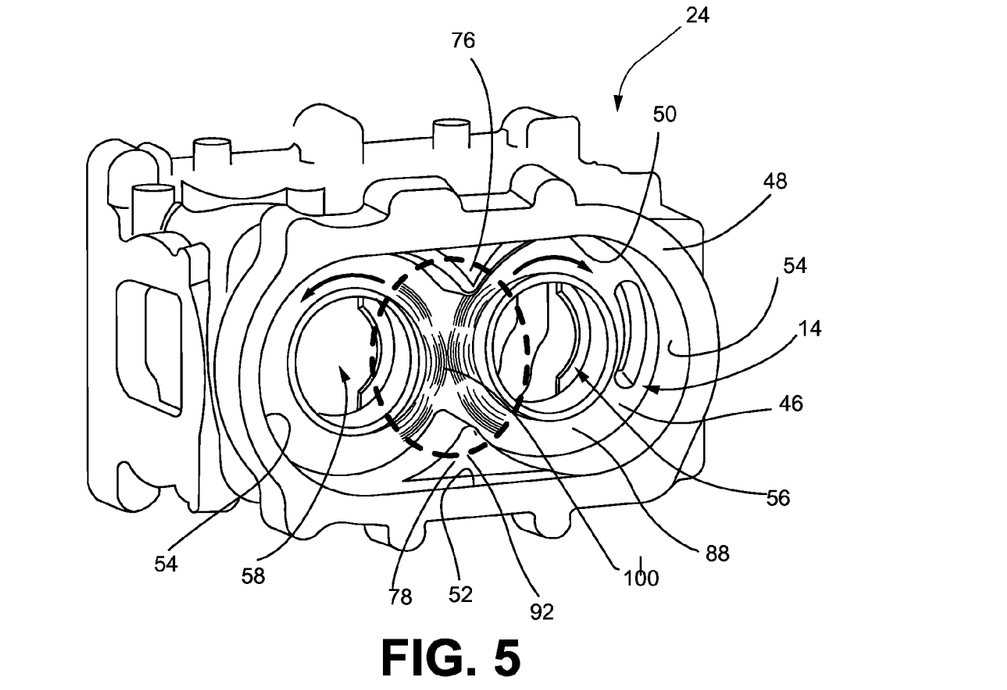
FIG. 5 is a perspective view of the pump housing body of FIG. 4.
Figure 6:
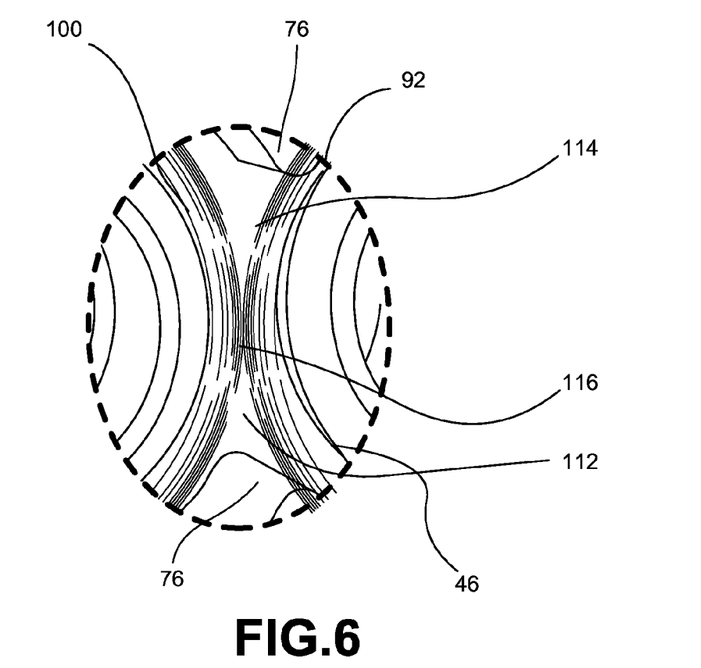
FIG. 6 is a close up view of a portion of the pump housing body of FIG. 5.

FIG. 5 is a perspective view of the housing body 24 of FIG. 4 from the gear cavity side showing the body expansion 100 from a different viewpoint. FIG. 6 is a close up view of a portion of the housing body 24 of FIG. 5 showing the body expansion 100 in greater detail. The body expansion 100 is integrally formed in the rear inner surface 88 of the inner wall 46 adjacent to the area 92 where the gears mesh (denoted generally by the oval 92 in FIGS. 5 and 6).

The rear inner surface 88 of the inner wall 46 is substantially planar except in the area adjacent the gear mesh area 92, where the body expansion 100 forms a channel or depression. The body expansion 100 extends from an area of the inner wall 46 adjacent to where the gears 42, 44 begin to mesh to an area of the inner wall 46 adjacent to where the gears 42, 44 begin to unmesh or disengage. The body expansion 100 serves as a channel or passage through which the lubricating oil can flow around the gears 42, 44 from one side of the gear mesh to the other side.

In the embodiment perhaps shown best in FIG. 6, the body expansion 100 is defined by a first outwardly (with respect to the gear cavity 14) sloping wall 112 and a second outwardly sloping wall 114 that converge near the middle of the gear mesh area 92, that is, the area of greatest engagement between where the drive gear 42 and the idler gear 44. The first outwardly sloping wall 112 is located adjacent where the gears 42, 44 begin to mesh, i.e., the area of highest oil pressure where the oil is being forced out of the mesh. The second outwardly sloping wall 114 is located adjacent the where the gears begin to unmesh, i.e., the area of lowest oil pressure. Assuming the gears rotate in the directions indicated by the dark arrows in FIG. 6, then the body expansion 100 extends from an area adjacent the first outwardly sloping wall 112—below where the gears 42, 44 begin to mesh—to an area adjacent to the second outwardly sloping wall 111—where the gears 42, 44 begin to unmesh or disengage.

The expansion 100—and the flange expansion 102 discussed below—serve as oil pressure relief zones. As the gears 42, 44 begin to mesh they force oil away, creating a high pressure area within the gear cavity 14. As the gears 42, 44 unmesh oil is drawn toward the voids created by the unmeshing gear teeth. The expansion 100 creates a flow passage to allow the oil to flow away from the high pressure areas and toward the low pressure areas with a minimal loss of power. In short, the expansion 100 helps reduce the rise in oil pressure where the gears mesh by providing additional space for the oil to flow around the gear mesh. The additional space preferably is in the form of a depression 100 in an otherwise flat wall 88. Put another way, the expansion 100 is intended to minimize the oil pressure differential between the area where the gears begin to mesh to the area where the gears 42, 44 begin to unmesh.

Figure 7:
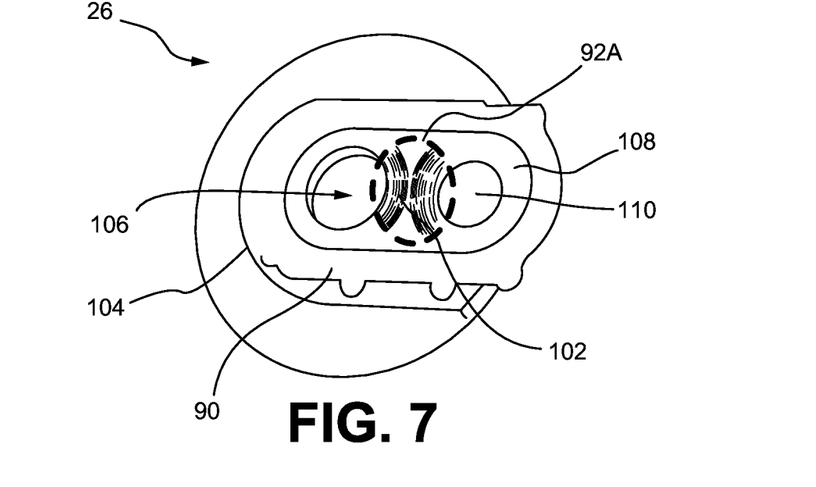
FIG. 7 is a perspective view of a flange modified according to the present disclosure.
Figure 8:
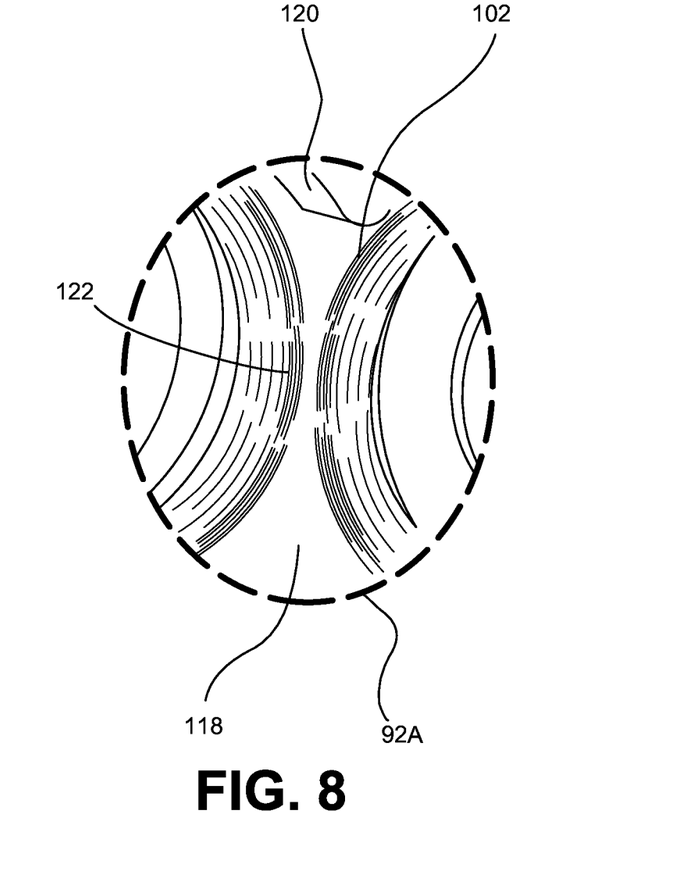
FIG. 8 is a close up view of a portion of the pump flange of FIG. 7.

Similarly, with respect to FIGS. 7 and 8, the front inner surface 90 of the flange 26 is substantially planar except in the area adjacent the gear mesh area 92, where the flange expansion 102 forms a depression. Like the body expansion 100, the flange expansion 102 may extend from an area of the flange front inner surface 90 adjacent to where the gears 42, 44 begin to mesh to an area of the flange front inner surface 90 adjacent to where the gears 42, 44 begin to unmesh. The flange expansion 102 serves as a channel or passage through which the lubricating oil can flow around the gears 42, 44 from one side of the gear mesh to the other side.

FIG. 7 is a perspective view of a flange 26 modified according to the present disclosure showing the flange expansion 102. FIG. 8 is a close up view of a portion of the pump flange 26 of FIG. 7 showing the flange expansion 102 in greater detail. The flange 26 defines the front inner surface 90 of the gear cavity 14, the front inner surface 90 having a perimeter 104, a drive shaft opening 106 and a substantially circular raised ring 108 defining a recess 110 which aligns with and receives an end of the idler pump shaft 40. The drive shaft opening 106 is disposed in the front inner wall 90 and is axially aligned with the drive shaft opening 56 in the body 24.

The front inner surface 90 is substantially co-extensive with the perimeter wall 48 of the housing body 24 (not shown in FIG. 7) and forms a fluid tight seal with the perimeter wall 48 when the body 24 and the flange 26 are bolted together. The flange expansion 102 is integrally formed on the front inner wall 90 adjacent to the area 92 where the gears mesh, which roughly corresponds to the area between the drive shaft opening 106 and the recess 110.

Referring to FIG. 8, the flange expansion 102 is defined by a first outwardly (with respect to the gear cavity 14) sloping wall 118 and a second outwardly sloping wall 120 that converge near the middle of the gear mesh area 92. The first outwardly sloping wall 118 is located adjacent where the gears 42, 44 begin to mesh and the second outwardly sloping wall 120 is located adjacent the where the gears begin to unmesh.

The expansions 100, 102 negate or minimize the tendency of the gears to act as a gear pump, in which oil is pumped from the gear cavity 14 to the pump cavity 16 and back again, by allowing the oil in the gear cavity 14 to flow around the gear mesh area 92 within the gear cavity 14. In this regard, the expansions 100, 102 serve as front and rear passages or "valleys" through which the oil may flow from the high pressure side of the gears 42, 44 where they mesh to the low pressure side of the gears 42, 44 where they unmesh. This change in flow "short circuits" the gear pump effect, enabling the oil to travel from one side of the gear mesh area 92 to the other side of the gear mesh area 92, rather than having the gears circulate oil to and from the pump cavity 16.

While the expansions 100, 102 have been referred to as "valleys" formed in the inner wall 46 and the flange 26 respectively, they may be any suitable shape that allows the oil to travel from one side of the gear mesh area 92 to the other side of the gear mesh area 92 but still within the gear cavity 14. For example, each expansion 100, 102 may comprise a concave area of any suitable shape formed in the inner wall 46 and the flange 26 respectively and axially adjacent the area 92 where the gears 42, 44 are engaged. The concave area may be elongated in the vertical direction, that is, in the direction defined by a line passing through the area of greatest gear engagement. The depth of the concave area may vary, and may be any depth that facilitates the flow of oil around the gear mesh area 92. The preferred shape of the concave areas is that which minimizes churning losses.

Preferably the expansions 100, 102 are "cast in", meaning they are formed when the body 24 and flange 26 are cast. The expansions 100, 102 may be mirror images of each other, forming identical flow passages around the gear mesh area 92.

The depth of the expansions 100, 102 is a function of the power loss due to the oil churning within the gear cavity. That is, the expansions 100, 102 should be deep enough to allow oil to flow around the gear mesh but not so deep that oil churning increases.

Alternatively, instead of a pair of depressions, tubes or tunnels may be formed in one or both sides of the gear cavity walls to allow the lubricating oil to flow around the gears 42, 44 from one side of the gear mesh to the other side. The tube may have an inlet opening adjacent to where the gears 42, 44 begin to mesh and an outlet opening adjacent to where the gears 42, 44 begin to unmesh.

Indeed, any type of expansion or passage that allows the lubricating oil to flow from one side of the gear mesh to the other side may provide be employed to reduce oil churning and thus lower power loss. However, expansion areas such as the ones described above would be generally easier to manufacture than tunnel type passages.

A computational fluid dynamic (CFD) analysis revealed that the addition of arcuate side passages 62 and expansions 100, 102 and (similar to the body 24 and flange 26 depicted in FIGS. 5-8), resulted in a 0.4 kW reduction in power loss due to churning compared to a hydraulic pump without side passages 62 and body and flange expansions 100, 102.

INDUSTRIAL APPLICABILITY

The spur gear housing features described herein may be used with any suitable housing where spur gears submerged in lubricating oil are used to transfer power, especially where churning loss is present. For example and without limitation, the spur gear housing oil passages and expansion features may be used with a side by side hydraulic pump, including those used in excavators and similar machines.

It is understood that the embodiments of the disclosure described above are only particular examples which serve to illustrate the principles of the disclosure. Modifications and alternative embodiments of the disclosure are contemplated which do not depart from the scope of the disclosure as defined by the foregoing teachings and appended claims. It is intended that the claims cover all such modifications and alternative embodiments that fall within their scope.

We claim:

1. A housing for a spur gear set, the housing comprising a first member and a second member affixed together to define a gear cavity within which are located a drive gear and a driven gear submerged in fluid, the gear cavity having an area where the gears mesh, the first member comprising an inner wall forming a substantially planar rear inner surface of the gear cavity, the second member forming a substantially planar front inner surface of the gear cavity, the housing further comprising:

a first expansion integrally formed in the rear inner surface of the inner wall adjacent to the area where the gears mesh, the first expansion being a space through which the fluid flows around the gears from one side of the area where the gears mesh to the other side of the area where the gears mesh;

a second expansion integrally formed in the front inner surface of the second member adjacent to the area where the gears mesh, the second expansion being a space through which the fluid flows around the gears from one side of the area where the gears mesh to the other side of the area where the gears mesh;

wherein the first expansion is defined by a first outwardly sloping wall located adjacent an area of highest oil pressure within the gear cavity and a second outwardly sloping wall located adjacent an area of lowest oil pressure within the gear cavity; and wherein the second expansion is defined by a first outwardly sloping wall located adjacent an area of highest oil pressure within the gear cavity and a second outwardly sloping wall located adjacent an area of lowest oil pressure within the gear cavity.

2. The housing of claim 1 wherein the first expansion and the second expansion are depressions.

3. The housing of claim 1 wherein the first expansion and the second expansion are tunnels, each tunnel having an inlet opening adjacent to the area where the gears begin to mesh and an outlet opening adjacent to the area where the gears begin to unmesh.

4. The housing of claim 1 wherein:

the first expansion is defined by a first wall sloping outwardly away from the gears and a second wall sloping outwardly away from the gears, the first and second walls converging near the area of greatest engagement between where the drive gear and the driven gear mesh; and the second expansion is defined by a first wall sloping outwardly away from the gears and a second wall sloping outwardly away from the gears, the first and second walls converging near the area of greatest engagement between where the drive gear and the driven gear mesh.

5. The housing of claim 1 wherein:

the first expansion comprises a concave area formed in the inner wall; and the second expansion comprises a concave area formed in the front inner surface of the second member.

6. The housing of claim 1 wherein:

the first expansion comprises a first concave area formed in the inner wall, the first concave area being elongated in a direction defined by a line passing through an area of greatest gear engagement; and the second expansion comprises a second concave area formed in the front inner surface, the second concave area being elongated in a direction defined by a line passing through an area of greatest gear engagement.

7. The housing of claim 1 wherein the housing is part of a hydraulic pump, the first member is a housing body, and the second member is a flange.

8. The housing of claim 1 further comprising one or more passages formed in the inner wall to allow movement of the fluid into and out of the gear cavity.

9. The housing of claim 8 wherein the first member further comprises a perimeter wall forming a top inner surface, a bottom inner surface and side inner surfaces of the gear cavity, and wherein the one or more passages comprises two arcuate shaped side passages located near the side inner surfaces of the perimeter wall, each side passage forming an arc of less than ninety degrees.

10. The housing of claim 9 wherein the side passages are equidistant from the top inner surface and the bottom inner surface of the perimeter wall.

11. The housing of claim 10 wherein the first member comprises integrally formed top and bottom gear shrouds, the top gear shroud extending downward from the top inner surface of the perimeter wall and having downwardly converging curved sides that meet along a substantially linear apex located equidistant the gears, the bottom gear shroud extending upward from the bottom inner surface of the perimeter wall and having upwardly converging curved sides that meet along a substantially linear apex located equidistant the gears.

12. The housing of claim 11 wherein the housing is part of a hydraulic pump, the first member is a housing body, and the second member is a flange.

13. A housing for a spur gear set, the housing comprising a first member and a second member affixed together to define a gear cavity within which are located a drive gear and a driven gear submerged in fluid, the gear cavity having an area where the gears mesh, the first member comprising an inner wall forming a substantially planar rear inner surface of the gear cavity, the second member forming a substantially planar front inner surface of the gear cavity, the housing further comprising:
    a first expansion integrally formed in the rear inner surface of the inner wall adjacent to the area where the gears mesh, the first expansion being a space through which the fluid flows around the gears from one side of the area where the gears mesh to the other side of the area where the gears mesh;
    a second expansion integrally formed in the front inner surface of the second member adjacent to the area where the gears mesh, the second expansion being a space through which the fluid flows around the gears from one side of the area where the gears mesh to the other side of the area where the gears mesh;
    wherein the first expansion comprises a first concave area formed in the inner wall, the first concave area being elongated in a direction defined by a line passing through an area of greatest gear engagement; and
    wherein the second expansion comprises a second concave area formed in the front inner surface, the second concave area being elongated in a direction defined by a line passing through an area of greatest gear engagement.

14. The housing of claim 13 wherein the first expansion and the second expansion are depressions.

15. The housing of claim 13 wherein the first expansion and the second expansion are tunnels, each tunnel having an inlet opening adjacent to the area where the gears begin to mesh and an outlet opening adjacent to the area where the gears begin to unmesh.

16. The housing of claim 13 wherein:
    the first expansion is defined by a first wall sloping outwardly away from the gears and a second wall sloping outwardly away from the gears, the first and second walls converging near the area of greatest engagement between where the drive gear and the driven gear mesh; and
    the second expansion is defined by a first wall sloping outwardly away from the gears and a second wall sloping outwardly away from the gears, the first and second walls converging near the area of greatest engagement between where the drive gear and the driven gear mesh.

17. The housing of claim 13 wherein:
    the first expansion is defined by a first outwardly sloping wall located adjacent an area of highest oil pressure within the gear cavity and a second outwardly sloping wall located adjacent an area of lowest oil pressure within the gear cavity; and
    the second expansion is defined by a first outwardly sloping wall located adjacent an area of highest oil pressure within the gear cavity and a second outwardly sloping wall located adjacent an area of lowest oil pressure within the gear cavity.

18. The housing of claim 13 wherein the housing is part of a hydraulic pump, the first member is a housing body, and the second member is a flange.

19. The housing of claim 13 further comprising one or more passages formed in the inner wall to allow movement of the fluid into and out of the gear cavity.

20. The housing of claim 19 wherein the first member further comprises a perimeter wall forming a top inner surface, a bottom inner surface and side inner surfaces of the gear cavity, and wherein the one or more passages comprises two arcuate shaped side passages located near the side inner surfaces of the perimeter wall, each side passage forming an arc of less than ninety degrees.

21. The housing of claim 20 wherein the side passages are equidistant from the top inner surface and the bottom inner surface of the perimeter wall.

22. The housing of claim 21 wherein the first member comprises integrally formed top and bottom gear shrouds, the top gear shroud extending downward from the top inner surface of the perimeter wall and having downwardly converging curved sides that meet along a substantially linear apex located equidistant the gears, the bottom gear shroud extending upward from the bottom inner surface of the perimeter wall and having upwardly converging curved sides that meet along a substantially linear apex located equidistant the gears.

23. The housing of claim 22 wherein the housing is part of a hydraulic pump, the first member is a housing body, and the second member is a flange.

24. A housing for a spur gear set, the housing comprising a first member and a second member affixed together to define a gear cavity within which are located a drive gear and a driven gear submerged in fluid, the gear cavity having an area where the gears mesh, the first member comprising an inner wall forming a substantially planar rear inner surface of the gear cavity, the second member forming a substantially planar front inner surface of the gear cavity, the housing further comprising:
    a first expansion integrally formed in the rear inner surface of the inner wall adjacent to the area where the gears mesh, the first expansion being a space through which the fluid flows around the gears from one side of the area where the gears mesh to the other side of the area where the gears mesh;
    a second expansion integrally formed in the front inner surface of the second member adjacent to the area where the gears mesh, the second expansion being a space through which the fluid flows around the gears from one side of the area where the gears mesh to the other side of the area where the gears mesh;

one or more passages formed in the inner wall to allow movement of the fluid into and out of the gear cavity;

wherein the first member further comprises a perimeter wall forming a top inner surface, a bottom inner surface and side inner surfaces of the gear cavity, and wherein the one or more passages comprises two arcuate shaped side passages located near the side inner surfaces of the perimeter wall, each side passage forming an arc of less than ninety degrees;

wherein the side passages are equidistant from the top inner surface and the bottom inner surface of the perimeter wall; and wherein the first member comprises integrally formed top and bottom gear shrouds, the top gear shroud extending downward from the top inner surface of the perimeter wall and having downwardly converging curved sides that meet along a substantially linear apex located equidistant the gears, the bottom gear shroud extending upward from the bottom inner surface of the perimeter wall and having upwardly converging curved sides that meet along a substantially linear apex located equidistant the gears.

25. The housing of claim 24 wherein the housing is part of a hydraulic pump, the first member is a housing body, and the second member is a flange.

\* \* \* \* \*